United States Patent Office 3,172,884
Patented Mar. 9, 1965

3,172,884
PURIFICATION OF HECOGENIN
Menachem Lewin, Rehov Hillel, Jerusalem, Otto Eisner, Rehov Uruguay, Jerusalem, Michael Mielcharek, Shikun, Jerusalem, and Tamar Bernstein, Rehov Uruguay, Jerusalem, Israel, assignors to the State of Israel, Jerusalem, Israel
No Drawing. Filed Oct. 22, 1962, Ser. No. 232,245
Claims priority, application Israel, Nov. 23, 1961, 16,363
8 Claims. (Cl. 260—239.55)

The present invention concerns a process for obtaining pure hecogenin from crude hecogenin recovered from the leaves of the agave plant.

Crude hecogenin is recovered from the leaves of agave plants by submitting the starting material to a treatment by which the heconin is hydrolysed. Such hydrolysis may be carried out under atmospheric pressure in the presence of considerable quantities of an extraneous acid or under elevated pressure as described in Israel patent specification No. 16,362, in which case it is possible to operate with considerably less or even without extraneous acid. The starting material for the hydrolysis may, for example, be the juice expressed from the agave leaves or even better an alcoholic extract from this juice, preferably freed as far as possible from mineral and lipoidic components in the manner described in Israel patent specification No. 16,340.

Crude hecogenin obtained from agave leaves contains as a rule between 10 and 70% by weight of pure hecogenin, the exact amount depending on the nature of the starting material and the method of hydrolysis employed. It is an object of the present invention to provide a process for isolating pure hecogenin from this crude product.

The difficulties encountered hitherto in the purification of crude hecogenin obtained from agave leaves stem mainly from the fact that the hecogenin and the accompanying impurities are soluble in the same solvents and insoluble in the same non-solvents.

Lower saturated paraffins such, as for example, hexane, heptane, petroleum ether and the like are bad solvents for hecogenin. It has now surprisingly been found that when these solvents are admixed with a polar solvent for hecogenin such as, for example, methanol, hecogenin is more readily soluble in the resulting mixture than the accompanying impurities.

The invention consists in a process for the recovery of pure hecogenin from a crude product obtained from agave leaves by hydrolysis of the heconin contained in the leaves, comprising the steps of producing from the crude product a solution of hecogenin in a solvent mixture containing at least one polar solvent, at least one non-polar non-solvent for hecogenin and a controlled amount of water, inducing separation of the solution into two phases and recovering hecogenin from the upper phase.

According to one embodiment of the invention the crude hecogenin is extracted with a suitable solvent, e.g. methanol, and the resulting extract is admixed with the proper amount of non-solvent and water until phase separation. Instead of pure water a solvent/water mixture may be added.

According to another embodiment of the invention the crude hecogenin is extracted with a mixture of solvent and non-solvent, preferably an azeotropic mixture and the resulting extract is admixed with the proper amount of water or a solvent/water mixture.

According to yet another embodiment of the invention, a solvent/non-solvent/water mixture is used for the extraction of the crude hecogenin, the extraction temperature being so selected that the liquid phase remains homogeneous. The resulting extract is then cooled to such an extent that phase separation occurs.

Finally, in some cases, where the crude product and/or the solvent has a relatively high moisture content and accordingly sufficient water is co-extracted with the hecogenin, the addition of extraneous water may be omitted. In such a case phase separation is induced by cooling the solution resulting from the extraction of the crude product with a solvent/non-solvent mixture or a solvent alone and subsequent admixture of a non-solvent, as the case may be.

In any case the upper phase is separated from the lower one and submitted to suitable recovery operations. In some cases the hecogenin already beings to precipitate from the upper phase during phase separation and accordingly the upper phase will be submitted to a suitable straining operation. This may then be followed by further suitable steps such as concentration, cooling or complete removal of the solvent, for the recovery of additional amounts of hecogenin.

The process according to the invention may be carried out in a continuous manner. This may, for example, be achieved by proceeding according to the third of the above three embodiments, i.e. by using as extractant a solvent/non-solvent/water mixture and carrying out the extraction at a temperature at which this mixture remains in the form of a homogeneous phase. The resulting extract is fed continuously to the upper section of a vessel of the type serving for liquid-liquid extraction where it is cooled to such an extent that phase separation occurs. The upper, non-polar phase is removed continuously into a distillation vessel from where the non-solvent is distilled off continuously and recycled to the bottom of said vessel in which phase separation occurs. In this vessel the recycled non-polar phase flows in countercurrent to the fresh extract fed into the vessel. The surplus polar phase is continuously discharged from the bottom section of said vessel in which phase separation occurs and is recycled to the extraction.

The hecogenin obtained in accordance with the invention by precipitation from the non-polar phase and/or evaporation of the solvent from the non-polar phase may be further purified by methods known per se. For example, it may be dissolved in methanol, the solution boiled with activated charcoal for the removal of pigments and other impurities and re-crystallized by cooling and/or by the addition of a non-polar non-solvent.

The invention is illustrated by the following examples to which it is not limited.

*Example 1*

2.5 litres of juice from agave leaves was neutralized with milk of lime to pH 7.8, heated up to boiling temperature and the precipitate which formed was separated by filtration. The filtrate was concentrated in vacuo to a thick mass containing 45% by weight of water and was then extracted with methanol. The methanolic extract was reextracted with petroleum ether to remove lipoids and pigments. At this stage the alcoholic extract contained predominantly saponins. The extract was concentrated, the resulting concentrate admixed with 2 litres of a 20% by weight sulfuric acid and the mixture refluxed for 4 hours while stirring. A precipitate formed which was filtered off in the heat, washed with hot water to neutral reaction and dried at 110° C. 8.9 g. of crude hecogenin was obtained in the form of a dark brown powder.

The crude hecogenin was extracted with benzene in a Soxhlet apparatus and from the extract obtained, benzene was distilled off on a water bath. The dry residue was dissolved in 200 ml. of 95% methanol in the heat and the solution admixed with 150 ml. of 30% methanol. Pale, cream-coloured hecogenin precipitated and was filtered off.

The precipitate was washed with 60% methanol, dried in vacuo and in this manner 4.6 g. of the product of M.P. 248–258° C. was obtained.

The above product was still crude hecogenin. It was dissolved in 100 ml. of anhydrous methanol and the solution introduced in a Soxhlet apparatus where it was admixed, after cooling, with 100 ml. of hexane. 90% aqueous methanol was then added with stirring, until a separation into two phases became just visible. Thereafter, an azeotropic methanol-hexane mixture was continuously circulated through the solution. The non-polar phase was withdrawn and concentrated to a volume of 150 ml. whereupon hecogenin precipitated in the form of pale, cream-coloured crystals of M.P. 254–268° C. Altogether 4.05 g. of pure hecogenin was obtained.

The pure product was admixed with acetic anhydride and anhydrous acetic acid, the mixture heated on an oil bath until the entire material had dissolved, and then refluxed for 10 minutes. The hecogenin acetate obtained was crystallized from alcohol. Yield: 3.8 g. of a crystalline substance of M.P. 252° C. and 98.8% purity as determined by infra-red absorption. The product was free of tigogenin, as determined by the ultra-violet absorption spectrum of a solution in sulfuric acid.

*Example 2*

9.4 g. of crude hecogenin obtained from the juice of agave leaves in a manner similar to that described in Example 1 and containing 71.3% by weight of pure hecogenin was extracted continuously in a solid-liquid extractor with a homogeneous solvent mixture obtained by mixing at room temperature two volumes of petroleum ether (40–60° C.) with one volume of anhydrous methanol and so much 80% aqueous methanol as to just produce a phase separation. The extraction was carried out at 32–33° C. at which the above solvent mixture was homogeneous.

The extract discharged from the extractor was fed continuously into the upper section of a vessel of the type serving for liquid-liquid extraction in which the temperature was maintained at 18–20° C. so that phase separation occurred. The lower polar phase was continuously pumped back to the extractor. The upper non-polar phase was discharged into a distillation vessel where the liquid phase was distilled off. The condensed non-polar solvent was recycled into the lower section of the above liquid-liquid extractor type vessel so that it came in counter-current contact with the fresh extract continuously introduced into the upper section of this vessel.

In this manner the recovery of pure hecogenin proceeded continuously and eventually 6.1 g. of pure hecogenin melting at 254–258° C. was collected in the distillation vessel. For further purification the product was dissolved in methanol, the solution boiled with activated charcoal, filtered and the hecogenin recrystallized by the addition of petroleum ether.

We claim:

1. A process for the recovery of pure hecogenin from a crude product obtained from agave leaves by hydrolysis of the heconin contained in the leaves, comprising the steps of producing from the crude product a solution of hecogenin in a solvent mixture containing a polar solvent, an organic non-polar non-solvent for hecogenin, and an amount of water sufficient to effect separation of the solution into two phases; inducing the stratification of the solution in two phases; and recovering hecogenin from the upper phase.

2. Process according to claim 1, comprising extracting crude hecogenin with a solvent for hecogenin, mixing the resulting extract with a non-solvent for hecogenin and water in such proportions that two phases are formed, and withdrawing the upper phase for the recovery therefrom of hecogenin.

3. Process according to claim 1, comprising extracting crude hecogenin wth a mixture of solvent and non-solvent for hecogenin, mixing the resulting extract with so much water that two phases are formed, and withdrawing the upper phase for the recovery therefrom of hecogenin.

4. Process according to claim 1, comprising extracting crude hecogenin with a mixture of a solvent for hecogenin and water, mixing the resulting aqueous extract with a non-solvent for hecogenin so that two phases are formed, and withdrawing the upper phase for the recovery therefrom of hecogenin.

5. Process according to claim 1, comprising extracting crude hecogenin with a solvent for hecogenin/non-solvent for hecogenin/water mixture at a temperature at which said mixture forms a homogeneous phase, cooling the resulting extract so much that phase separation occurs, and withdrawing the upper phase for the recovery therefrom of hecogenin.

6. Process according to claim 1 comprising extracting crude hecogenin with a mixture of solvent and non-solvent for hecogenin thereby to produce an aqueous hecogenin extract as a result of co-extraction of water from the crude hecogenin, cooling this aqueous extract so much that two phases are formed, and withdrawing the upper phase for the recovery therefrom of hecogenin.

7. A process in accordance with claim 1 wherein said polar solvent is an alcohol.

8. A process in accordance with claim 1 wherein said non-polar non-solvent is an aliphatic hydrocarbon.

References Cited by the Examiner
UNITED STATES PATENTS

| | | | |
|---|---|---|---|
| 2,827,456 | 3/58 | Holt et al. | 260—239.55 |
| 2,954,374 | 9/60 | Townley | 260—239.55 |

FOREIGN PATENTS

| | | |
|---|---|---|
| 768,459 | 2/57 | Great Britain. |

LEWIS GOTTS, *Primary Examiner.*